(12) United States Patent
Wang et al.

(10) Patent No.: US 6,732,420 B2
(45) Date of Patent: May 11, 2004

(54) METHOD FOR RIVETING METAL MEMBERS THEREWITH

(75) Inventors: Pei-Chung Wang, Troy, MI (US); Daniel B. Hayden, Macomb township, MI (US); Robin Stevenson, Bloomfield, MI (US)

(73) Assignee: General Motors Corporation, Detroit, MI (US)

(*) Notice: Subject to any disclaimer, the term of this patent is extended or adjusted under 35 U.S.C. 154(b) by 0 days.

(21) Appl. No.: 10/094,073

(22) Filed: Mar. 8, 2002

(65) Prior Publication Data

US 2003/0167620 A1 Sep. 11, 2003

(51) Int. Cl.[7] .................... B21J 15/02; B23P 11/00; B21D 39/00
(52) U.S. Cl. .................. 29/525.06; 29/525.13; 29/521; 29/524.1
(58) Field of Search ............... 29/525.06, 525.13, 29/521, 505, 432, 509, 524.1; 411/395, 82, 930

(56) References Cited

U.S. PATENT DOCUMENTS

| 3,434,743 A | * | 3/1969 | Boeker ................. 285/39 |
| 3,639,137 A | * | 2/1972 | Marinelli ............. 428/321.5 |
| 5,752,305 A | | 5/1998 | Cotterill et al. |
| 5,957,777 A | | 9/1999 | Singh et al. |

FOREIGN PATENT DOCUMENTS

| JP | 11-33664 | 9/1999 |
| WO | WO 98/01679 | 1/1998 |

* cited by examiner

Primary Examiner—John C. Hong
(74) Attorney, Agent, or Firm—Kathryn A. Marra

(57) ABSTRACT

A rivet and method for riveting metal members, and particularly, metal sheets is disclosed. The apparatus includes a rivet assembly for driving a piercing rivet into stacked metal sheets and a die for assisting in supporting the sheets during driving of the rivet and for assisting in securing the rivets to the sheets. The rivet of the invention includes an adhesive that is forced through passages in the rivet for assisting in fastening the rivet to the sheets and for assisting in fastening the sheets to each other with greater strength.

14 Claims, 3 Drawing Sheets

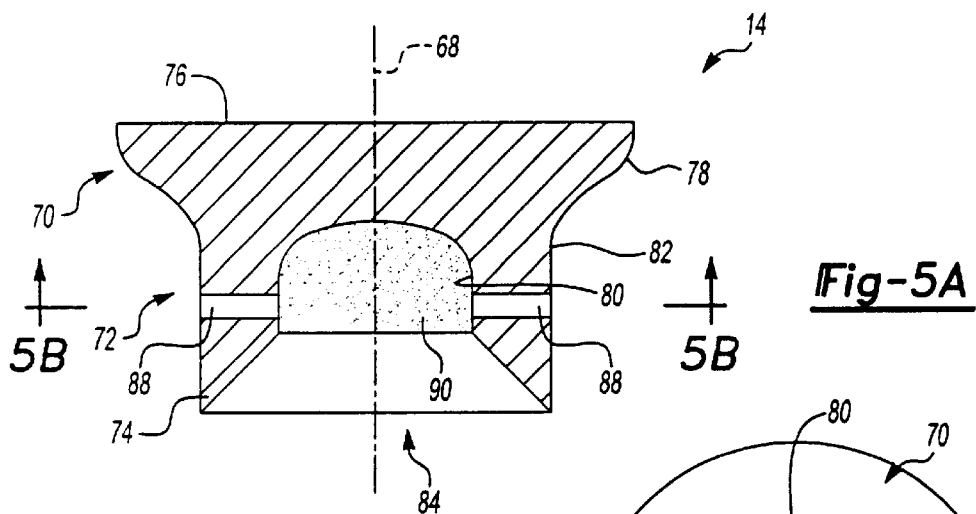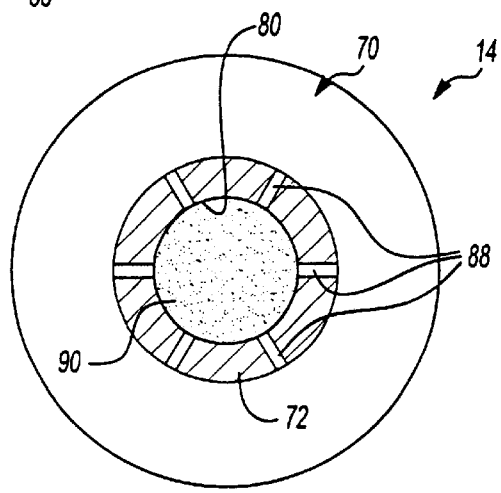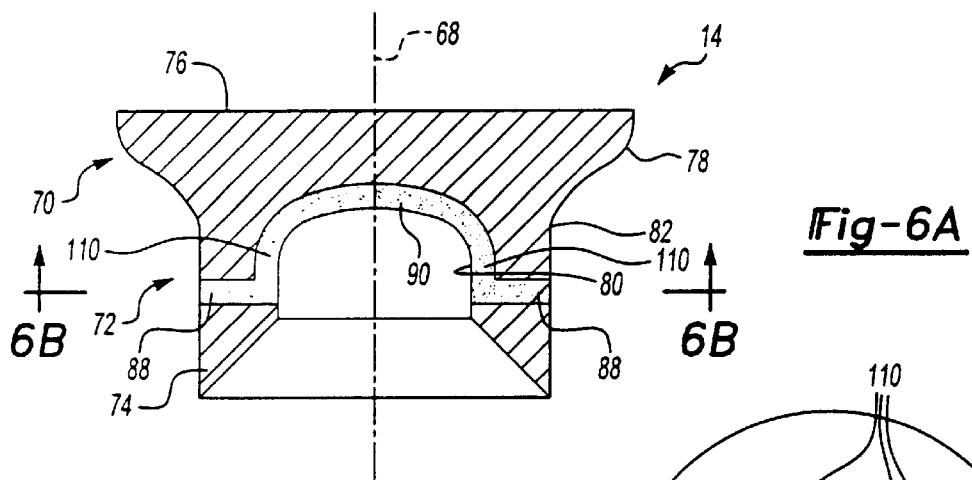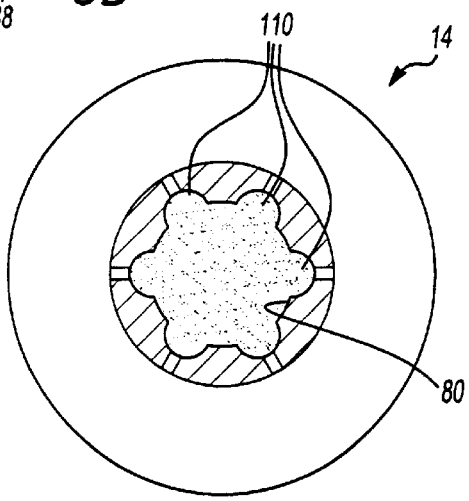

US 6,732,420 B2

METHOD FOR RIVETING METAL MEMBERS THEREWITH

TECHNICAL FIELD

The present invention relates to a rivet and method for riveting metal members together for assembling automotive vehicle structures.

BACKGROUND OF THE INVENTION

It is known that the manufacture of automotive vehicles often requires that metal members be attached to each other to form automotive vehicle structures. Pierce riveting is one potential method of attaching such members, particularly, metal sheets. Pierce riveting typically requires a sharpened end portion of a rivet to pierce through a first of two stacked metal sheets, and through at least a portion of a second of the stacked sheets. During such piercing, the sharpened end portion of the rivet is typically deformed or bent to secure the rivet to the sheets. For conventional pierce riveting processes, however, large amounts of force may be required to pierce the sheets. Moreover, such processes typically rely solely on a mechanical interlock of the rivet to secure the sheets together and may not secure the sheets together with a desired amount of strength. Therefore, there is a need for improved pierce riveting techniques, apparatuses or both, for achieving high integrity attachment of metal members such as metal sheets.

SUMMARY OF THE INVENTION

The present invention meets these needs by providing an improved method of riveting a first metal member to a second metal member, with particular utility in the formation of components for an automotive vehicle. The method involves riveting the members by providing a piercing rivet having a central axis, a generally disk-shaped head portion and an annular portion extending outwardly from a bottom surface of the head portion. The annular portion defines a cavity and a plurality of passages extend through the annular portion. An adhesive in a flowable state is disposed in the cavity of the annular portion. For riveting, a first metal member is stacked on a second metal member, wherein each of the members has a first side and a second side, and at least a portion of the second side of the first member is in overlapping contact with at least a portion of the first side of the second member for forming an overlapped region. The first and second metal members are placed between a rivet assembly and a die, the rivet assembly including a punch, the die having a cavity. Thereafter, the rivet is driven through the first metal member and partially through the second metal member in the overlapped region. During driving, the annular portion of the rivet is deformed radially outward away from the central axis of the rivet to interferingly secure the rivet to the members thereby attaching the members to each other. The adhesive is forced out of the cavity through the plurality of passages of the rivet thereby positioning the adhesive between an outer annular surface of the rivet and portions of the first member and the second member. Thereafter, the adhesive is cured to adhesively secure the rivet to the first and second members.

The present invention also provides a rivet for riveting a first metal member to a second metal member. The rivet includes a generally disk-shaped head portion disposed about a central axis and having a substantially flat top surface and a generally conical bottom surface. The rivet also has an annular portion centered about the central axis and extending outwardly from a bottom surface of the head portion. The annular portion includes an outer annular surface and a sharpened piercing edge. The annular portion also includes an inner annular surface at least partially defining a substantially cylindrical cavity within the annular portion. A plurality of passages are radially disposed in the annular portion and extend from the inner surface to the outer surface. Moreover, the rivet is adapted to receive an adhesive in a flowable state in the cavity of the annular portion such that the adhesive may be forced through the plurality of passages to adhesively secure to the outer annular surface of the rivet and to the first and second members.

The present invention thus provides an improved rivet and riveting technique for providing securing piercing rivets in stacked members thereby more securely fastening the members together. The ability to combine the mechanical interlock of a rivet with the additional fastening strength of an adhesive creates particularly high integrity joints for securing stacked members together.

BRIEF DESCRIPTION OF THE DRAWINGS

These and other aspects and advantages of the present invention will become apparent upon reading the following detailed description in combination with the accompanying drawings, in which:

FIG. 5($a$) illustrates a side sectional view of an exemplary rivet;

FIG. 5($b$) illustrates a bottom sectional view of the rivet of FIG. 5($a$) taken along line 5B—5B;

FIG. 6($a$) illustrates a side sectional view of another exemplary rivet; and

FIG. 6($b$) illustrates a bottom sectional view of the rivet of FIG. 6($a$) taken along line 6B—6B.

DETAILED DESCRIPTION OF THE PREFERRED EMBODIMENT

Figure 1:
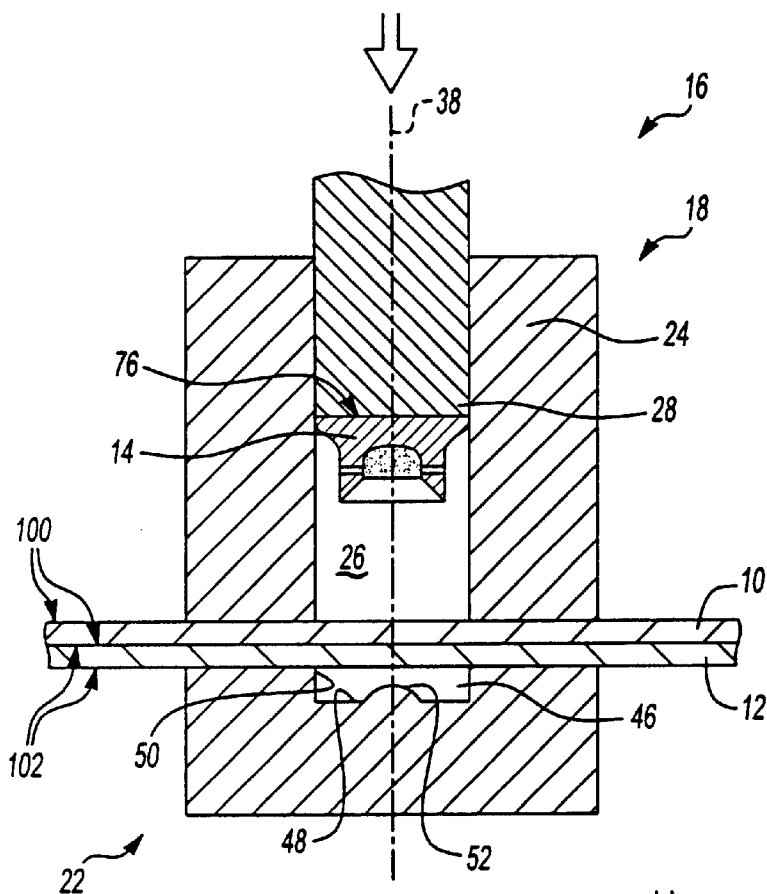
FIG. 1 is a sectional view of a riveting apparatus prior to riveting a pair of stacked metal sheets to each other.
Figure 2:
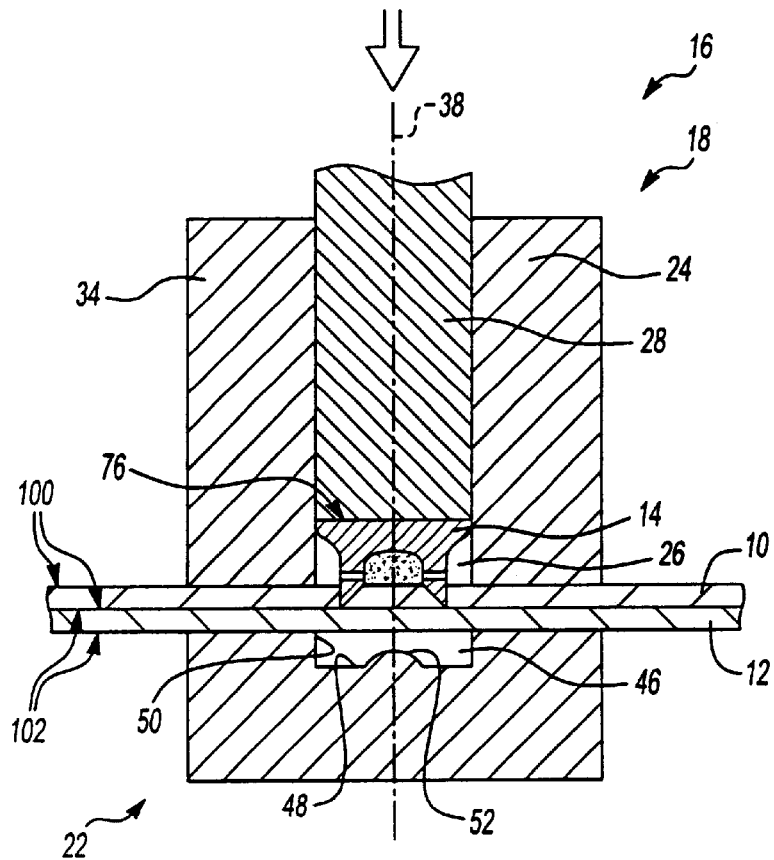
FIG. 2 is a sectional view of the riveting apparatus of FIG. 1 during riveting of the pair of stacked metal sheets to each other.
Figure 3:
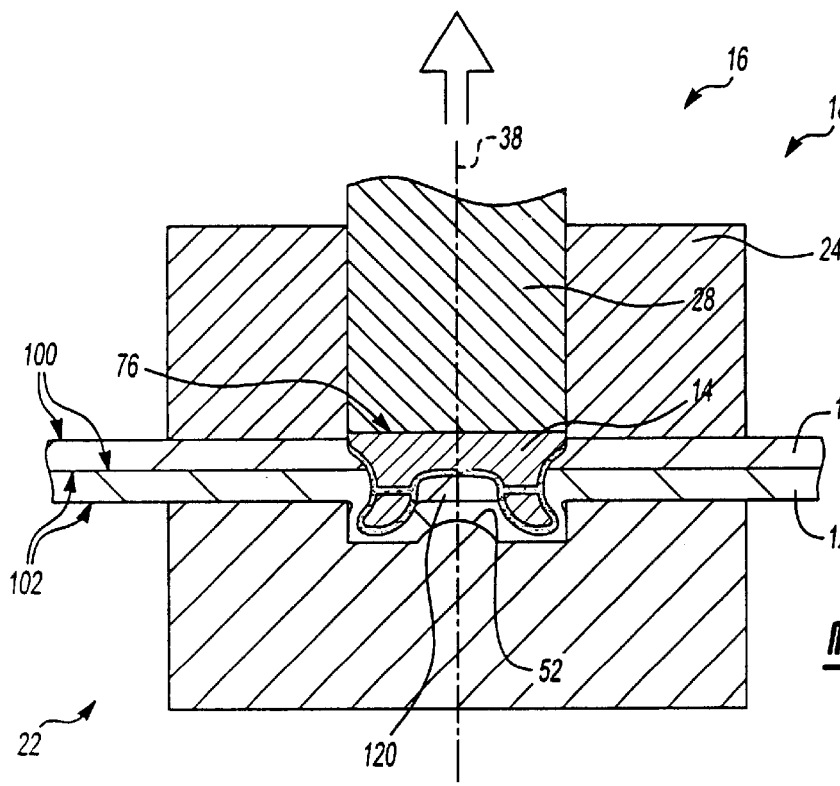
FIG. 3 is a sectional view of the riveting apparatus of FIG. 1 further along in the riveting of the pair of stacked metal sheets to each other.

Referring to FIGS. 1–3, a first metal member (depicted as a sheet 10) is riveted to a second metal member (also depicted as a sheet 12) with a piercing rivet 14 that is driven into the sheets 10, 12 by a riveting apparatus 16. The riveting apparatus 16 includes a rivet driving assembly 18 for driving the rivet 14 through the first sheet 10 and into the second sheet 12 and a die 22 for supporting the metal sheets 10, 12 and for assisting in securing the rivet 14 to the sheets 10, 12.

The rivet assembly 18 includes a clamp 24 (e.g., a generally elongated metal binder clamp) having an opening 26 extending down at least a portion of a length of the clamp 24. A punch 28 (e.g., an elongated cylindrical steel punch) of the assembly 18 is received in the opening 26 and the punch 28 is moveable along a length of the opening 26 between, for example, at least a first position, as shown in FIG. 1, and a second position, as shown in FIG. 3. The punch 28 may be moved hydraulically, mechanically, electrically, pneumatically or otherwise.

In FIGS. 1–3, the punch 28, the opening 26 and the binder clamp 24 are generally cylindrical, coaxial or both about an axis 38 extending centrally along their lengths. Optionally, a housing (not shown) can be used to house or fasten the binder clamp 24 and the punch 28 together. Alternatively, other conventional fasteners or fastening techniques may be used.

The die 22 includes a central cylindrical opening or cavity 46 defined by a bottom circular surface 48 and a peripheral annular wall surface 50, which may be integrated into a single continuous surface. Preferably, the die 22 includes a protrusion 52 that extends into the cavity 46 from the center of the circular surface 48. Alternatively, the die 22 may be formed in a variety of sizes or with a variety of cavity shapes depending upon the rivet 14 to be driven into the sheets 10, 12, the properties of the sheets 10, 12, the thickness of the sheets or a combination thereof. Preferably, the die 22 is supported by tooling, a stand or the like.

Figure 4:
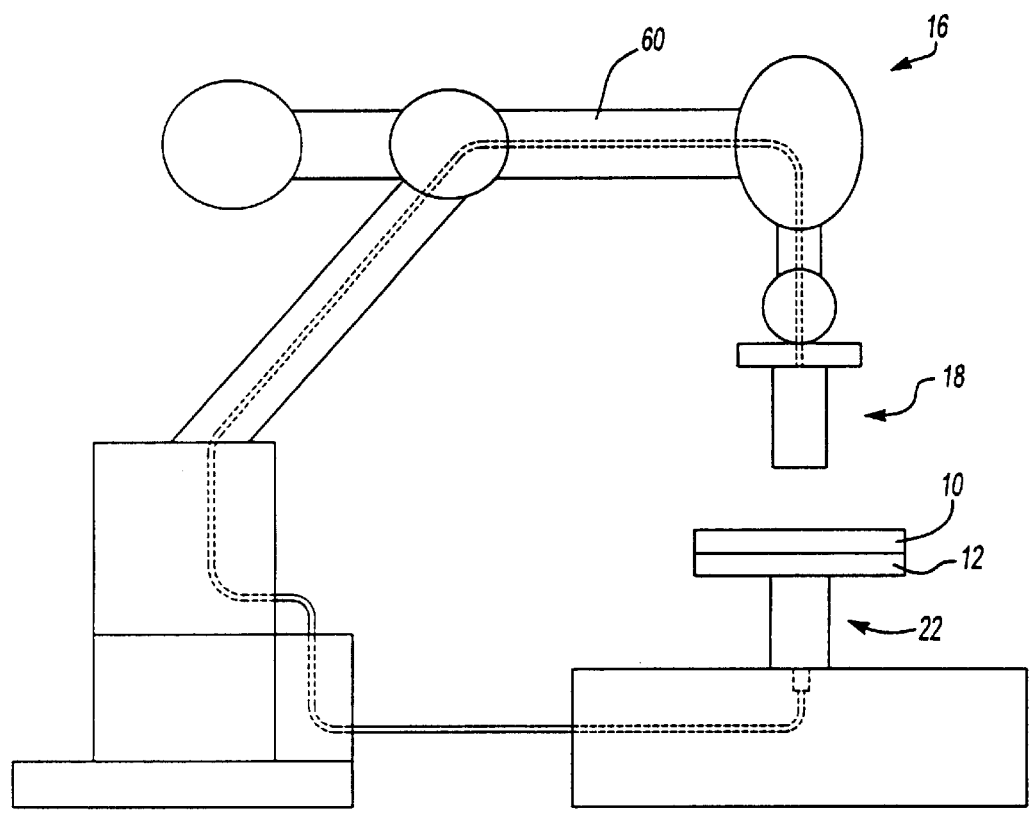
FIG. 4 illustrates the riveting apparatus of FIGS. 1, 2 and 3 with a robot arm and an energy source.

The rivet assembly 18, the die 22 or both may be mounted to various apparatus for moving the rivet assembly 18 or the die 22 relative to each other, such as robots, C-frames or hard tooling such as a die set. In the exemplary embodiment shown in FIG. 4, the rivet assembly 18 is attached to a robot arm 60 that can move the rivet assembly 18 as needed or desired. The die 22 is positioned adjacent the robot arm 60.

Referring now to FIGS. 5(a)–5(b), there is shown a piercing rivet 14 that is substantially symmetrical about a central axis 68 and includes a head portion 70 and a body portion 72 with a sharpened edge portion 74, that is adapted to both pierce a material and deform during piercing for forming an interlock. The head portion 70 is generally disk-shaped with a substantially flat top surface 76 and a generally conical bottom surface 78. The body portion 72 is generally annular and extends outwardly away from the bottom surface 78 of the head portion 70. Preferably, the head portion 70 extends radially outwardly away from the central axis 68 further than the body portion 72.

The body portion 72 includes an inner annular surface 80 and an outer annular surface 82. The inner annular surface 80 at least partially defines a central substantially cylindrical cavity 84 within the rivet 14. Preferably, the body portion 72 includes a plurality of passages 88 extending radially away from the central axis 68 and extending from the inner surface 80 to the outer surface 82.

The rivet 14 may be formed of a variety of high strength to weight metals such as aluminum or magnesium alloys. Preferably, however, the rivet 14 is formed of a mild or high strength steel. Optionally, the rivet 14 may be coated with a suitable protective coating, such as an anti-corrosion agent, or may be selectively hardened at certain portions for achieving a hardness gradient in the rivet.

An amount of adhesive 90 is disposed within the cavity 84 for assisting the rivet 14 to securely join the sheets 10, 12 together as further described below. Preferably, the adhesive 90 is epoxy-based and has the ability to adhere securely to one or more metals. In one embodiment, the adhesive 90 is generally flowable at temperatures typically experienced in an automotive assembly plant (e.g., about 10° C. to about 40° C.) and cures to a hardened state at elevated temperatures (e.g., about greater than 100° C.). One example of a commercially available adhesive is sold under the tradename BETAMATE 4601 and is commercially available from the Dow Chemical Corporation, Midland, Mich.

Referring additionally to FIGS. 1–3, the piercing rivet 14 is positioned within the rivet assembly 18 for allowing the punch 28 to drive the rivet 14 into the sheets 10, 12. As shown, the top surface 76 of the rivet 14 is contacted substantially flush against the punch 28. The rivet 14 may be temporarily secured against the punch 28, such as by magnetic forces, with a securing member (not shown) or otherwise.

The first metal sheet 10 and second metal sheet 12 each include a first side 100 and a second side 102. The first sheet 10 is stacked upon the second sheet 12 such that at least a portion of the second side 102 of the first sheet 10 is in substantially continuous contact with at least a portion of the first side 100 of the second sheet 12 to form an overlapping portion or region for receiving the rivet 14. The sheets 10, 12 may be formed of the same or different of several metals. Preferably, the sheets 10, 12 are formed of metal alloys of aluminum, magnesium, steel of various strengths or the like with thicknesses ranging between 0.6 mm and 3.0 mm, although thicker of thinner sheets may also be used.

The stacked sheets 10, 12 are placed between the rivet assembly 18 and the die 22 of the riveting apparatus 14. Preferably, the sheets 10, 12 are placed upon the die 22 such that the second side 102 of the second sheet 12 contacts the die 22. Thereafter, the rivet assembly 18 is contacted with first side 100 of the first sheet 10 (e.g., using the robot arm 60 or another apparatus) to clamp the sheets 10, 12 between the rivet assembly 18 and the die 22.

Once the sheets 10, 12 are clamped, the punch 28 is moved from its first position shown in FIG. 1 to its second position as shown in FIG. 3 to drive the rivet 14 at least partially through the overlapping region of the sheets 10, 12. As shown, the sharpened piercing edge 74 of the rivet 14 pierces entirely through the first sheet 10 and partially through the second sheet 12.

During driving of the rivet 14, the rivet 14 urges a portion 120 of the first and second sheets 10, 12 into contact with the protrusion 52 of the die 22 thereby pinching the portion 120 between the rivet 14 and the protrusion 52. In turn, the protrusion 52 places a force on the portion 120 of the sheet 10, 12 and the force is transmitted to the annular portion 72 of the rivet 14. This force at least partially bends or deforms the annular portion 72, starting with the sharpened edge 74, radially away from the central axis 68 of rivet 14 to interferingly secure the rivet 14 to the sheets 10, 12 thereby attaching the sheets 10, 12 to each other. Preferably, the rivet 14 is driven through the first sheet 10 and into the second sheet 12 until the top surface 76 of the head portion 70 is substantially flush with the first surface 100 of the first sheet 10.

Additionally, during driving of the rivet 14, the portion 120 of the sheets 10, 12 that contacts the protrusion 52 of the die 22 is pushed into the cavity 84 of the rivet 14 thereby forcing the adhesive 90 out of the cavity 84. The adhesive 90 is either forced through the passages 88 of the rivet 14, around the sharpened edge 74 of the rivet 14 or both thereby positioning the adhesive 90 between the outer annular surface 82 of the rivet 14 and portions of the first sheet 10, the second sheet 12 or both. The adhesive 90 may also be at least partially sandwiched between the second surface 102 of the first sheet 10 and the first surface 100 of the second sheet 12.

Thereafter, the adhesive 90 is cured to more securely attach the rivet 14 to the sheets 10, 12 and to more securely attach the sheets 10, 12 to each other. Preferably, the adhesive 90 cures after exposure to elevated temperatures of about 130° C. to about 220° C., and more preferably temperatures of about 160° C. to about 180° C. and most preferably about 170° C. Cure times may range, but are preferably less than 60 minutes, more preferably between about 20 and 40 minutes and most preferably about 25 minutes. Such time lengths and elevated temperatures are typically encountered during a baking cycle during painting of the automotive vehicle.

Advantageously, riveting of the sheets 10, 12 while simultaneously adhesively securing the rivet 14 to the sheets 10, 12 fastens the rivet 14 more securely to the sheets 10, 12 thereby more securely fastening the sheets 10, 12 together.

In FIGS. 6(a) and 6(b), there is illustrated an alternative rivet 14 substantially identical to the rivet 14 of FIGS. 5(a) and 5(b) with the exception that a plurality of channels 110 have been defined within the inner annular surface 80. Preferably, each of the channels 110 extends from adjacent the bottom surface 78 of the head portion 70 of the rivet 14 to one of the plurality of passages 88. Advantageously, the channels 110 assist the adhesive 90 to flow through the passages 88 toward the outer annular surface 82 of the rivet 14.

In alternative embodiments, the overlapped region of the sheets 10, 12 into which the rivet 14 is driven may be heated prior to driving the rivet 14 through the sheets 10, 12. As an example, an electric current may be passed through the sheets 10, 12 according to methods such as those disclosed in commonly owned copending application titled "A Method and Apparatus for Riveting Metal Sheets", U.S. Ser. No. 10/094,128 filed on the same date as the present application and fully incorporated herein by reference for all purposes.

The rivet and method described above may be used for attaching several different automotive components that have sheet metal or sheet metal portions. Resulting joints are also considered part of the present invention. Examples include peel joints, lap joints, various vehicle panels such as body panels, door panels, decklids, hoods, door frames, sunroof applications or the like. Furthermore, the overlapped regions of the sheets may be continuously bonded or intermittently bonded over some or all of its area.

It will be appreciated as well that the present invention is not limited to joining metal sheets, but may be employed to join members in a different form or material.

It should be understood that the invention is not limited to the exact embodiment or construction which has been illustrated and described but that various changes may be made without departing from the spirit and the scope of the invention.

What is claimed is:

1. A method of riveting a first member to a second member, comprising the steps of:
   (a) providing a piercing rivet having a central axis, a head portion and an annular portion extending outwardly from a bottom surface of the head portion wherein;
      (i) the annular portion defines a cavity;
      (ii) at least one passage extends through the annular portion; and
      (iii) an adhesive in a flowable state is disposed in the cavity of the annular portion;
   (b) placing the first member on the second member, wherein each of the members has a first side and a second side, and at least a portion of the second side of the first member is in overlapping contact with at least a portion of the first side of the second member for forming an overlapped region; and
   c) driving the rivet through the first member and at least partially through the second member in the overlapped region wherein;
      (i) the annular portion of the rivet is deformed radially away from the central axis of rivet to interferingly secure the rivet to the members thereby attaching the members to each other; and
      (ii) the adhesive is forced out of the cavity of the rivet through the passage of the rivet thereby positioning the adhesive between an outer annular surface of the rivet and portions of the first member and the second member; and
   (d) curing the adhesive to adhesively secure the rivet to the first and second members.

2. A method as in claim 1, wherein the rivet is formed of at least one metal alloy including a base metal selected from the group consisting of steel, aluminum and magnesium.

3. A method as in claim 1, wherein a punch is electrically actuated for driving the rivet through the members.

4. A method as in claim 1, wherein the adhesive is an epoxy that cures at temperatures from about 130° C. to about 220° C.

5. A method as in claim 1 wherein the adhesive is curable in less than 60 minutes.

6. A method as in claim 1 wherein the first and second members are formed of metal.

7. A method as in claim 6 wherein the adhesive is additionally located between a portion of the members after driving of the rivet.

8. A method of riveting a first sheet to a second sheet, comprising the steps of:
   a) providing a piercing rivet having a central axis, a head portion and an annular portion extending outwardly from a bottom surface of the head portion wherein;
      (i) the annular portion includes an outer annular surface and a sharpened piercing edge;
      (ii) the annular portion includes an inner annular surface at least partially defining a substantially cylindrical cavity within the annular portion;
      (iii) a plurality of passages are radially disposed in the annular portion and extend from the inner surface to the outer surface; and
      (iv) an adhesive in a flowable state is disposed in the cavity of the annular portion;
   (b) stacking a first sheet on a second sheet, wherein each of the sheets has a first side and a second side, and at least a portion of the second side of the first sheet is in overlapping contact with at least a portion of the first side of the second sheet for forming an overlapped region;
   (c) placing the first and second sheets between a rivet assembly and a die, the rivet assembly including a punch, the die having a cylindrical cavity with a protrusion extending into the cavity; and
   (d) driving the rivet through the first metal sheet and partially through the second metal sheet in the overlapped region wherein;
      (i) the annular portion of the rivet is deformed radially away from the central axis of rivet to interferingly secure the rivet to the sheets thereby attaching the sheets to each other; and
      (ii) the adhesive is forced out of the cavity through the passages of the rivet thereby positioning the adhesive between the outer annular surface of the rivet and portions of the first sheet and the second sheet;
   e) curing the adhesive to adhesively secure the rivet to the first and second sheets.

9. A method as in claim 8 wherein the rivet is formed of at least one metal alloy including a base metal selected from the group consisting of steel, aluminum and magnesium.

10. A method as in claim 8 wherein the punch is electrically actuated for driving the rivet through the sheets.

11. A method as in claim 8 wherein the adhesive is an epoxy that cures at temperatures from about 130° C. to about 220° C.

12. A method as in claim 8 wherein the adhesive is curable in less than 60 minutes.

13. A method as in claim 8 wherein the first and second sheets are formed of metal.

14. A method as in claim 13 wherein the adhesive is additionally located between a portion of the sheets after driving of the rivet.

* * * * *